(12) United States Patent
Son et al.

(10) Patent No.: US 7,646,465 B2
(45) Date of Patent: Jan. 12, 2010

(54) LIQUID CRYSTAL DISPLAY AND METHOD OF FABRICATING THE SAME

(75) Inventors: Jong-Ho Son, Seoul (KR); Sik-Young Jo, Chungcheongnam-do (KR); Dong-Hoon Chung, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 321 days.

(21) Appl. No.: 11/491,232

(22) Filed: Jul. 21, 2006

(65) Prior Publication Data

US 2007/0064186 A1    Mar. 22, 2007

(30) Foreign Application Priority Data

Sep. 22, 2005    (KR) .................. 10-2005-0088237

(51) Int. Cl.
*G02F 1/1339* (2006.01)
*G02F 1/1335* (2006.01)

(52) U.S. Cl. .................. 349/155; 349/156; 349/106

(58) Field of Classification Search ................. 349/155, 349/149, 156, 106, 108, 101
See application file for complete search history.

(56) References Cited

U.S. PATENT DOCUMENTS

| | | | | |
|---|---|---|---|---|
| 5,493,429 A | * | 2/1996 | Kanemoto et al. | 349/106 |
| 6,141,078 A | * | 10/2000 | Morii et al. | 349/155 |
| 6,162,654 A | * | 12/2000 | Kawabe | 438/30 |
| 7,345,731 B2 | * | 3/2008 | Sumi et al. | 349/155 |

FOREIGN PATENT DOCUMENTS

| | | |
|---|---|---|
| JP | 9-73099 | 3/1997 |
| JP | 2004-341539 | 12/2004 |
| KR | 10-2004-0098429 | 11/2004 |

OTHER PUBLICATIONS

Patent Abstracts of Japan, Publication No. 09-073099, Mar. 18, 1997, 1 p.
Patent Abstracts of Japan, Publication No. 2004-341539, Dec. 2, 2004. 1 p.
Korean Patent Abstracts, Publication No. 1020040098429, May 15, 2003, 1 p.

* cited by examiner

*Primary Examiner*—Walter L Lindsay, Jr.
(74) *Attorney, Agent, or Firm*—Innovation Counsel LLP

(57) ABSTRACT

Liquid crystal displays and fabrication methods thereof are provided. The liquid crystal display includes first substrate and second substrate facing the first substrate, and liquid crystal layer interposed therebetween. The first substrate includes a peripheral part spacer of which a surface includes a transparent conductive material, the peripheral part spacer being connected to a common voltage connector of the second substrate. A common voltage is applied to the first substrate through the common voltage connector and the peripheral part spacer. The peripheral part spacer is formed in the same process step with a display part spacer. To provide the peripheral part spacer with conductivity, the surface of the peripheral part spacer is covered with a transparent conductive material in the same process step in which the common electrode is formed on the first substrate. Accordingly, the peripheral part spacer configured to apply a common voltage to a common electrode can be formed without additional processing.

10 Claims, 12 Drawing Sheets

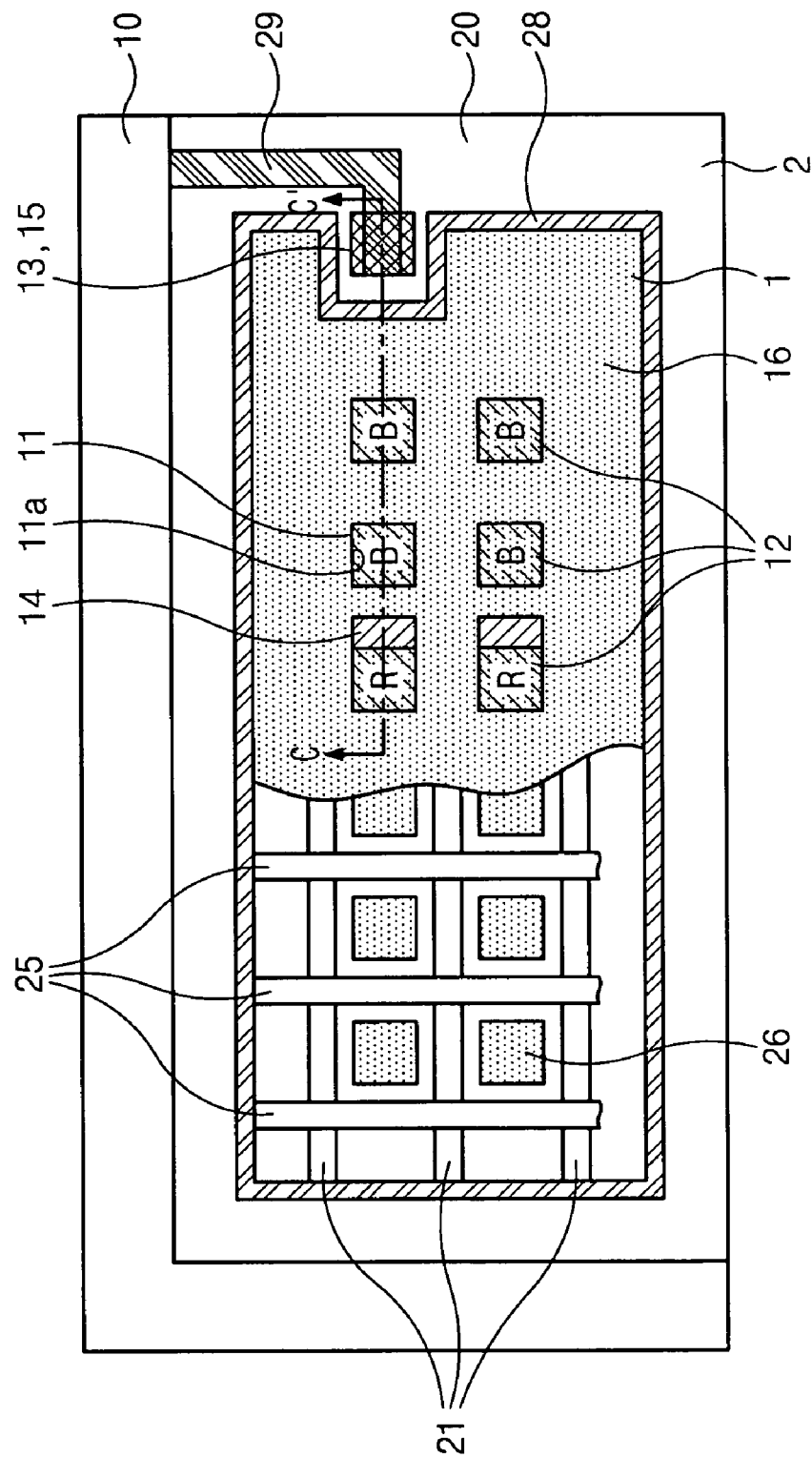

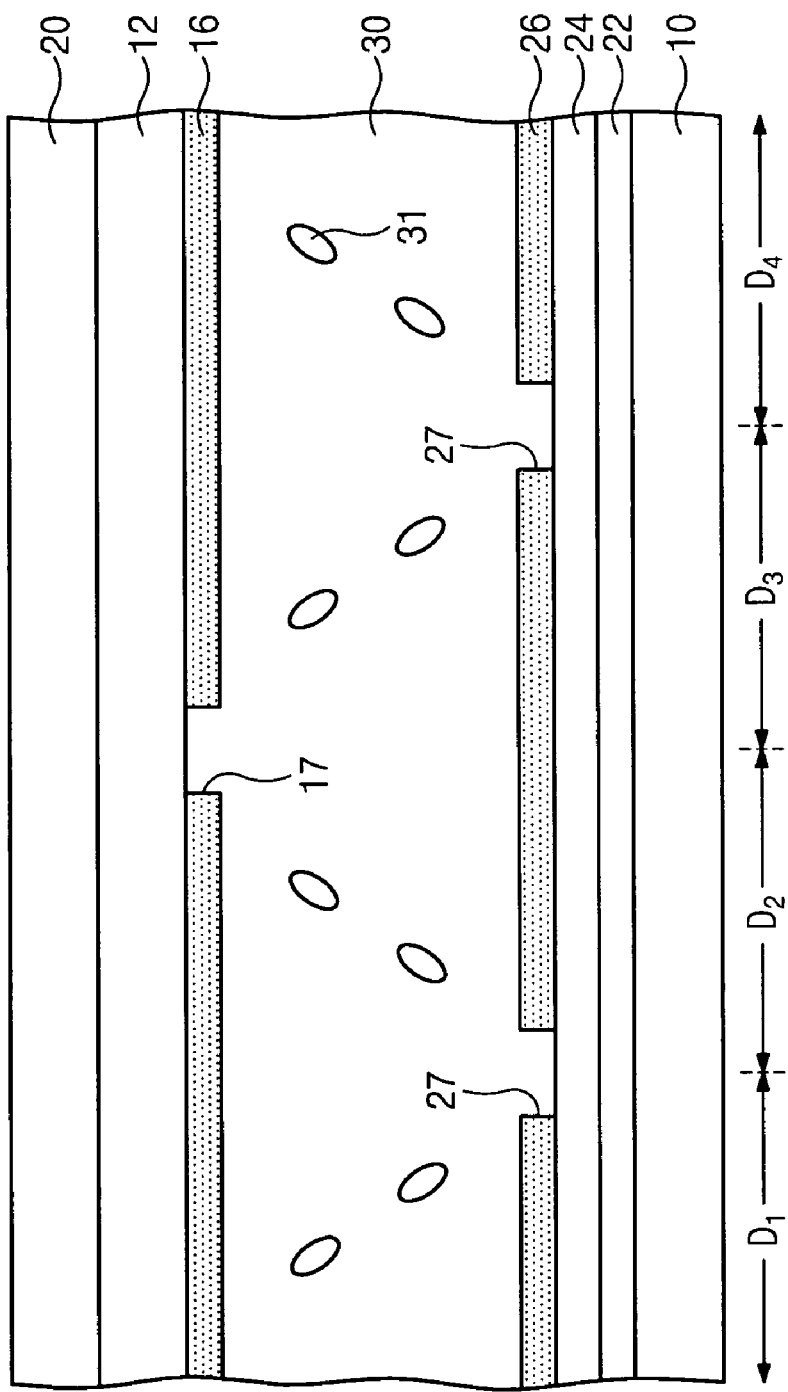

LIQUID CRYSTAL DISPLAY AND METHOD OF FABRICATING THE SAME

CROSS REFERENCE TO RELATED APPLICATION

The present application claims priority from Korean Patent Application No. 2005-88237, filed on Sep. 22, 2005, the disclosure of which is hereby incorporated herein by reference in its entirety.

BACKGROUND OF THE INVENTION

1. Field of the Invention

The present invention relates to a flat panel display, and more particularly, to a liquid crystal display using liquid crystal and a method of fabricating the liquid crystal display.

2. Description of Related Art

A flat panel display (FDP) generally has a slim profile and provides a flat picture. Examples of flat panel displays includes liquid crystal displays (LCDs) widely used for notebook computer monitors, plasma display panels (PDPs) widely used for a large screen-sized digital TV, or organic electroluminescent displays (OELDs) used in a handheld terminal, etc.

Among these FDPs, the LCD displays images by converting an input electrical signals into visual information, using the property that the light transmittance of liquid crystal material can be varied by controlling an electric field applied to the liquid crystal material. A conventional LCD includes first and second substrates each having an electrode formed thereon, and a liquid crystal layer interposed between the first and second substrates. By applying different voltages to the first and second substrates, respectively, an electric field is generated in the liquid crystal material. The local electric field for a region of the liquid crystal layer determines the alignment of molecules of the liquid crystal material, varying the light transmittance for that region. LCDs are widely used, since they are lightweight and have a slim profile and low power consumption.

Typically, a common electrode to which a constant common voltage is applied is formed on the first substrate, and a plurality pixel electrodes are formed on the second substrate. The plurality of pixel electrodes have a one-to-one corresponding to a plurality of pixel regions (which are commonly referred to as "pixels"). Each of the plurality of pixel electrodes receive a data voltage that corresponds with an image part. Typically, to reduce the number of fabrication steps and fabrication costs for a display, displays do not incorporate separately disposed drivers for the first substrate and second substrate to apply the common voltage and the data voltage. Instead, LCDs are typically designed such that the common voltage and the data voltage are applied to the second substrate by a single driver, and the common voltage is applied to the common electrode of the first substrate by a conductor connecting the first substrate and the second substrate.

Specifically, a common voltage applying part is formed along an edge of the second substrate, and a plurality of conductors each containing gold (Au) or silver (Ag) are formed on the common electrode applying part. One end of each of the plurality of conductors is connected to the common electrode of the first substrate, and a common voltage can be applied through the common voltage applying part and the conductor.

To apply the common voltage to the common electrode according to the aforementioned technique, a separate process (referred to as a 'short point process') of forming the conductors is used. The short point process is time-consuming and expensive, since it uses a noble metal, such as Au or Ag. The conductors can also be deposited in the form of paste on the common electrode applying part. During such a deposition of the conductors, the conductive material may diffuse and contaminate the LCD.

SUMMARY OF THE INVENTION

Exemplary embodiments of the present invention provide an LCD and a method of fabricating the same that can apply a common voltage at a low cost.

An embodiment of the present invention provides a method of fabricating a liquid crystal display. The method includes: providing a substrate having a display part and a peripheral part surrounding the display part; forming a display part spacer and a peripheral part spacer on the display part and the peripheral part, respectively; depositing a transparent conductive layer to cover an entire surface of the substrate, the display part spacer and the peripheral part spacer; and removing the transparent conductive layer covering the display part spacer such that the transparent conductive layer covering the peripheral part spacer remains.

According to embodiments of the present invention, the display part spacer and the peripheral part spacer are formed in the same process step. The peripheral part spacer is covered with a transparent conductive layer material and the transparent conductive layer material serves as a common electrode for the first substrate. Accordingly, although a separate short point process is omitted, it is possible to apply a common voltage to the common electrode using the peripheral part spacer.

One end of the peripheral part spacer is connected with the substrate (referred to as the 'first substrate') and a common voltage applying part (a common voltage connector) is formed on a separate substrate (referred to as the 'second substrate'). In operation, the common voltage is applied to the common electrode through the common voltage applying part of the second substrate and the peripheral spacer.

Another embodiment of the present invention provides a method of fabricating a liquid crystal display. The method includes: providing a first substrate and a second substrate each having a display part and a peripheral part enclosing the display part; forming a display part spacer on the display part of the first substrate and a peripheral part spacer on the peripheral part of the first substrate, respectively; depositing a transparent conductive layer to cover an entire surface of the first substrate, the display part spacer and the peripheral part spacer; partially removing the transparent conductive layer to form a common electrode on the first substrate and in the same process step removing the transparent conductive layer covering the display part spacer such that the transparent conductive layer covering the peripheral part spacer remains; forming a common voltage connector on the peripheral part of the second substrate, the common voltage connector configured to apply a voltage to the common electrode; and attaching the first substrate and the second substrate such that the peripheral part spacer is substantially aligned with and in electrical communication with the common voltage connector.

A plurality of gate lines and a plurality of data lines crossing the plurality of gate lines are formed on the second substrate to define a plurality of pixel regions, and a plurality of pixel electrodes are formed adjacent the plurality of pixel regions facing the common electrode. The common electrode may include a first cutaway pattern, and the pixel electrodes may include a second cutaway pattern, where the second cutaway pattern that does not overlap the first cutaway pattern. The first and second cutaway patterns are configured to increase the viewing angle of the LCD. By incorporating the step of forming the cutaway pattern with the step of forming the transparent conductive layer pattern on the surface of the peripheral spacer but not on the display part spacer, a total number of processing steps can be decreased.

Another embodiment of the present invention provides a liquid crystal display. The liquid crystal display includes: a first substrate, a second substrate, and a liquid crystal layer interposed between the first substrate and the second substrate; a color filter formed on a predetermined region of the first substrate; a common electrode formed on the color filter; a plurality of gate lines and a plurality of data lines formed on the second substrate and crossing each other to define a plurality of pixels; a plurality of switch elements each being formed in each of the plurality of pixel regions, each of the plurality of switch elements connected to an associated one of the plurality of gate lines and an associated one of the plurality of data lines; a plurality of pixel electrodes each being connected with an associated one of the plurality of switch elements; a common voltage connector formed on the second substrate outside an area where the plurality of pixel regions are defined, the common voltage connector configured to apply a common voltage to the common electrode; and a plurality of spacers positioned and configured to substantially maintain a predetermined interval between the first substrate and the second substrate, wherein at least one of the plurality of spacers is disposed outside the area where the plurality of pixel regions are defined.

The pixel electrode may be formed so as to cover the spacer disposed outside the area where the pixel regions are defined, and the spacer disposed outside the area where the pixel regions are defined is electrically connected with the common voltage connector and is used to apply a common voltage to the common electrode.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9A is a plane view when a first substrate and a second substrate are attached according to an embodiment of the present invention, FIG. 10A is a plane view of a unit pixel with a cutaway pattern according to an embodiment of the present invention and FIG. 10B is a sectional view taken along the line D-D' of FIG. 10A.

DETAILED DESCRIPTION OF THE INVENTION

Figure 1A:
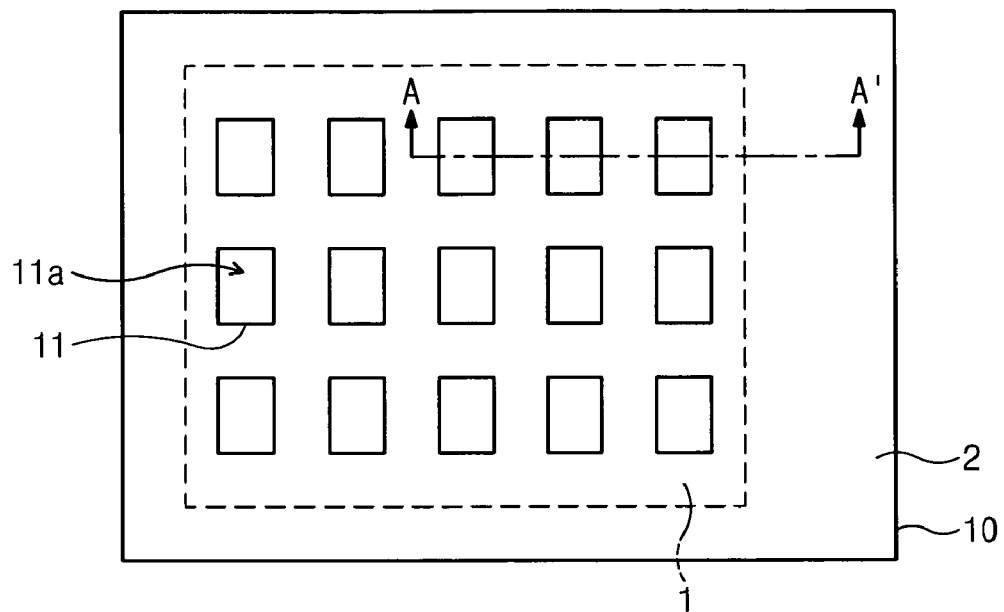
FIGS. 1A, 2A, 3A, 4A, and 5A are plane views illustrating a method of fabricating a first substrate according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the shapes of elements are generally exaggerated for clarity. Like reference numerals in the drawings denote like elements.

FIGS. 1A through 5A are plane views illustrating a method of fabricating a first substrate according to an embodiment of the present invention, and FIGS. 6A through 8A are plane views illustrating a method of fabricating a first substrate according to an embodiment of the present invention. For convenience of description, "first substrate" refers to a substrate on which a common electrode is formed, and "second substrate" refers to a substrate on which pixel electrodes are formed. However, it is noted that since the drawings of from FIGS. 1A through 5A and FIGS. 1B through 5B relate to a method of fabricating the first substrate, the term 'substrate' expressed without a particular description refers to the first substrate.

Figure 1B:
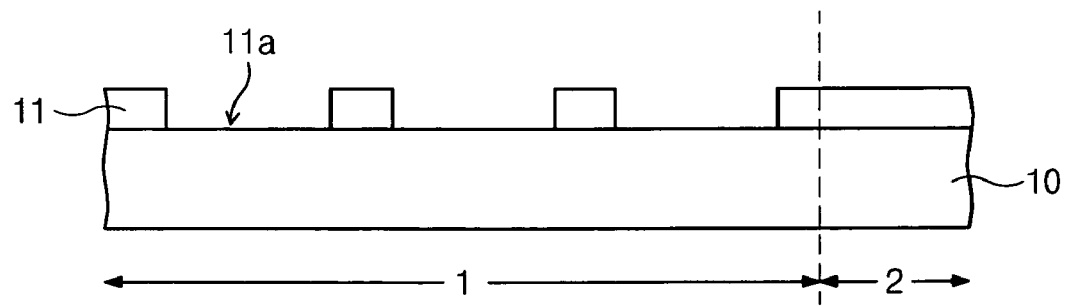
FIGS. 1B, 2B, 3B, 4B, and 5B are sectional views taken along the lines A-A' of FIGS. 1A through 5A.

Referring to FIGS. 1A and 1B, a light shielding film is formed on a substrate 10 having a display part 1 and a peripheral part 2. The substrate 10 is an insulating substrate, for example, a transparent glass substrate, a transparent plastic substrate, and the like. The light shielding film may be, for example, a thin chromium (Cr) film, a Cr oxide formed on a thin Cr film, or a black organic film. The light shielding film is patterned so as to have a plurality of openings 11a. In order to pattern the light shielding film, a photoresist pattern is formed on the light shielding film. Exposed portions of the light shielding film not coated with the photoresist pattern are etched, to form the plurality of openings 11 a. For embodiments in which the light shielding film comprises a black organic film with photoresistive properties, light shielding pattern 11 shown in FIGS. 1A and 1B may be formed using exposure and developing processes for the black organic film.

Figure 2A:
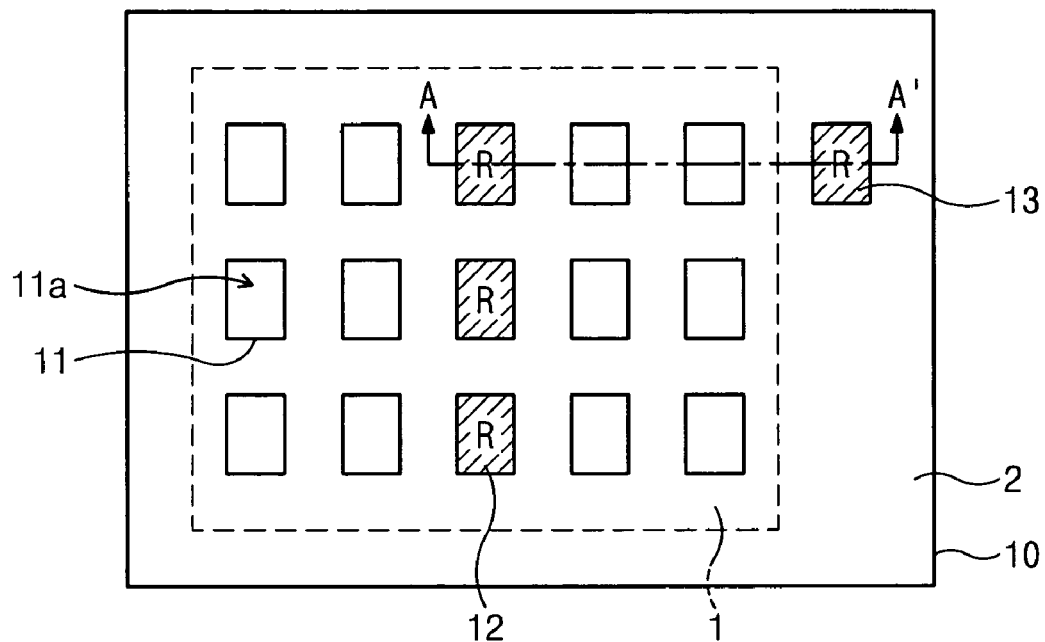
Figure 2B:
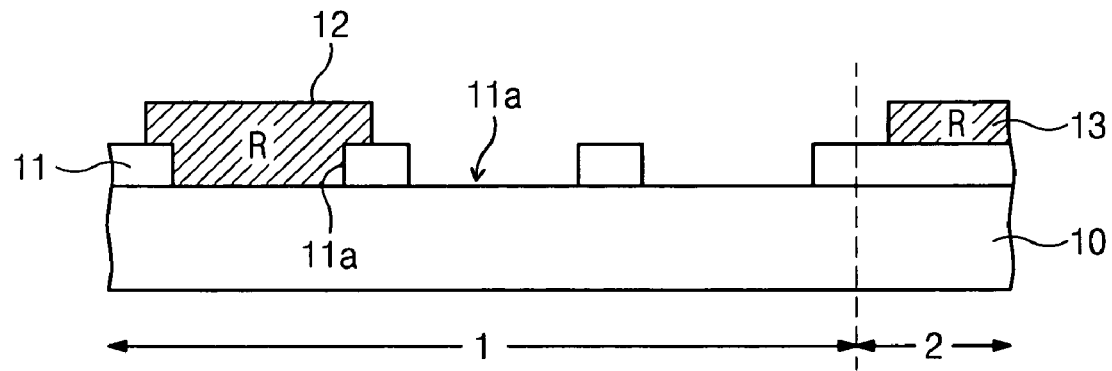

The openings 11a have a one-to-one correspondence with a plurality of pixels, and are regularly arranged in a column direction and a row direction. On the portion of substrate 10 not exposed by the openings 11a, light is shielded by the light shielding pattern Referring to FIGS. 2A and 2B, a color filter 12, 13 for displaying color images is formed on the substrate 10. The color filter 12, 13 include red (R), green (G) and blue (B) color filter elements corresponding three primary light components, and the red (R), green (G) and blue (B) color filter elements are formed in a predetermined order. FIGS. 2A and 2B illustrate a case starting with R color filter elements.

The R color filter elements are formed by coating a red photoresist film containing a red pigment on the entire surface of the substrate 10, exposing the coated red photoresist film to light, and developing the red photoresist film to remove exposed portions or non-exposed portions. The color filter elements can be arranged in a variety of configurations. In the stripe configuration recently frequently used, the R color filter elements are arranged along the openings 11a formed in one direction, as shown in FIG. 2A.

According to embodiments of the present invention, the R color filter elements are formed on the peripheral part 2 as well as the display part 1. According to the conventional art, it is not necessary to form the color filter elements on the peripheral part 2. However, the R color filter element of the peripheral part 2 is formed so as to achieve a specific goal of the present disclosure. Hereinafter, for the convenience of description, the color filter on the display part 1 are referred to as 'display part color filter 12, and the color filter on the peripheral part 2 is referred to as 'peripheral part color filter 13.

Figure 3A:
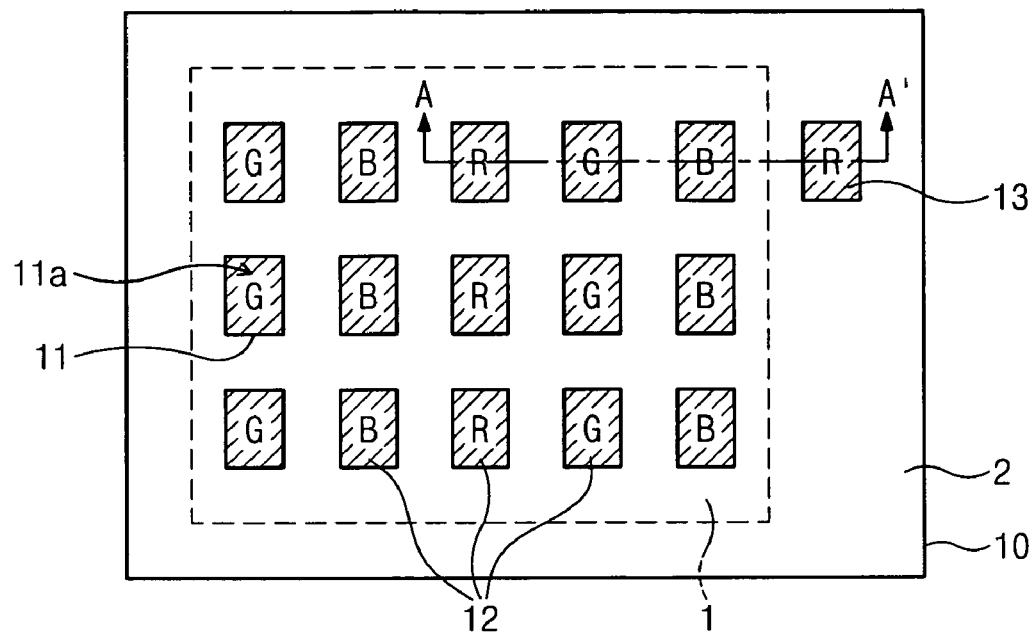
Figure 3B:
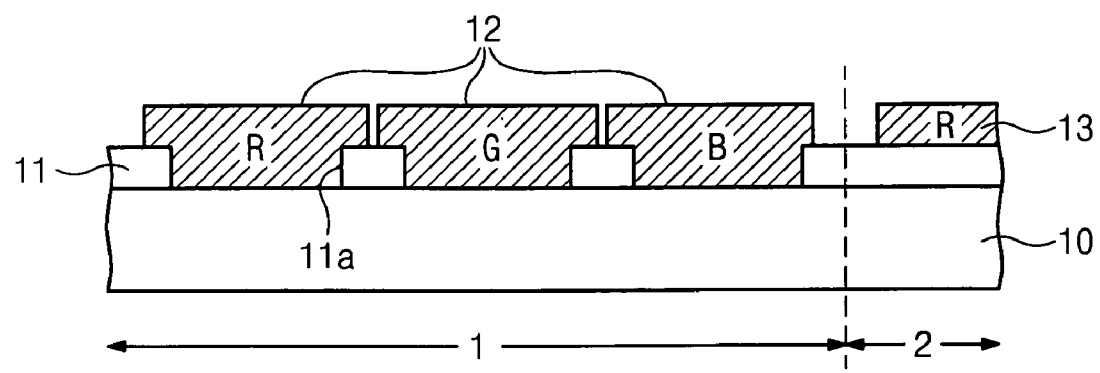

Referring to FIGS. 3A and 3B, green (G) filter elements and blue (B) filter elements are formed in the same manner as the R filter elements. In other words, a green photoresist film is coated on the entire surface of the substrate 10, and then the coated green photoresist film is exposed and developed, thereby forming green (G) filter elements. At this time, while the red photoresist film is formed on the peripheral part 2 as well as on the display part 1, the green photoresist film coated on the peripheral part 2 is completely removed. Likewise, by repeating the above procedure, blue (B) color elements are also formed.

The peripheral part color filter 13 need not be formed as a R color filter element. In other words, the peripheral part color filter 13 may be formed as either a G color filter element or a B color filter element. Also, the color of the peripheral part color filter 13 is not necessarily consistent with the first color in the configuration of color filter elements of the display part 1. For instance, when the color filters 12 of the display part 1 are formed in an order of B/G/R, the color of the peripheral part color filter 13 can be green (G). Further, if necessary, the peripheral part color filter 13 can be formed by stacking two or more color filter elements.

The display part color filter 12 can be formed with different heights according to their colors. When a height difference among different colors is large, it is preferable to consider heights matched with colors in selecting the color of the peripheral part color filter 13, which will be described later.

Forming the color filter 12, 13 on the first substrate 10 is not always essential. An LCD needs a separate second substrate facing the first substrate 10. The color filter 12, 13 may be formed on the second substrate, which is generally referred to as 'color filter on array (COA)'. In the COA structure, a process to form the color filter on the second substrate is added, while the process of forming the color filter on the first substrate is omitted.

Although not shown in the drawings, an overcoat layer may be formed on the color filter 12, 13 as a passivation layer. The overcoat layer can be formed by a spin coating method; for example, using acryl resin. The overcoat layer functions to protect the color filter 12, 13 and to planarize an upper surface of the substrate 10 that may be irregular due to the color filter 12, 13, the light shielding pattern 11, and the like. The overcoat layer may be used selectively, according to the circumstances.

Figure 4A:
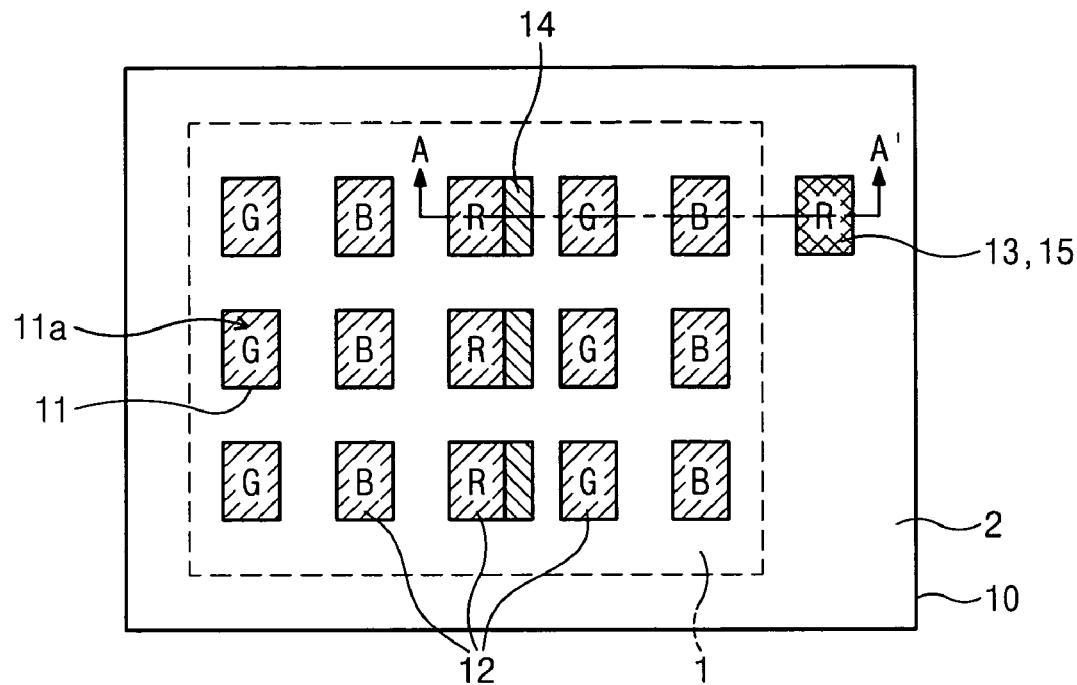
Figure 4B:
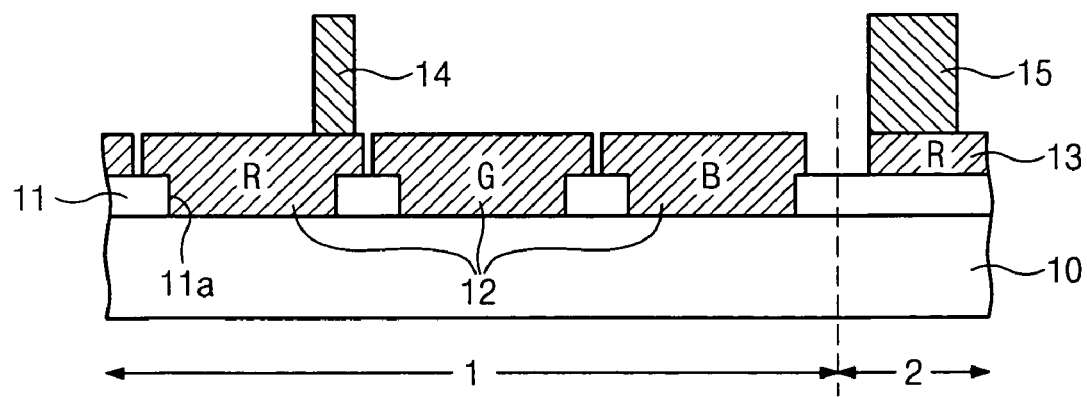

Referring to FIGS. 4A and 4B, spacers 14, 15 are formed on the substrate 10. The spacers 14, 15 are formed by coating a film containing a photoresist component and leaving the film only on necessary portions using a photolithography process. The spacers 14, 15 are referred to as a display part spacer 14 formed on the display part 1, and a peripheral part spacer 15 formed on the peripheral part 2 according to their positions. Spacers 14, 15 can be formed with the same height.

The display part spacer 14 is used to maintain a cell gap. The cell gap is the thickness of the liquid crystal layer and also refers to an interval between the first substrate and the second substrate of the LCD. The cell gap influences the general driving properties, such as a response rate, contrast ratio, viewing angle, brightness uniformity, and the like. If the cell gap is not constant, the LCD fails to display a uniform image throughout the whole display area, so that the picture quality may be degraded. Accordingly, it is important to maintain a substantially constant cell gap throughout the entire area of the substrate 10. For the above requirement, the display part spacer 14 is used.

The peripheral part spacer 15 is used to maintain the cell gap and may also be used to apply a voltage to the substrate 10, so that the conventional short point process need not be used. As described above, since the spacers 14, 15 are formed of an insulator containing a photoresist component, a separate subsequent process allowing the peripheral part spacer 15 to have the conductivity is required, to enable peripheral part spacer 15 to be used to apply the voltage to substrate 10.

In order to maintain a substantially constant cell gap throughout the entire area of the substrate 10, an appropriate number of display part spacers 14 should be uniformly distributed on the display part 1. One way for uniformly distributing the display part spacers 14 is to dispose the display part spacers 14 at the sites where the display part color filter 12 having a selected color are positioned. For example, in a color filter 12 having a stripe configuration (as in the illustrated example), since the R color filter elements, the G color filter elements and the B color filter elements are regularly and repeatedly arranged in one direction, the display part spacers 14 can be distributed corresponding to one of the three color filter elements. As a result, the display part spacers 14 are substantially uniformly distributed on substrate 10. For example, as shown in FIG. 4A, the display part spacers 14 can be distributed along the sites where the R color filter elements are formed.

It is preferable that the display part spacers 14 be disposed along the R color filter elements overlapping the light shielding pattern 11 corresponding to a boundary between the R color filter elements and the G color filter elements. In other words, since the display part spacers 14 can block light from progressing and decreasing the aperture ratio, the display part spacers 14 are preferably formed at sites that can maintain a cell gap as well as prevent the aperture ratio from being lowered. In this aspect, it is preferable that the display part spacers 14 be formed overlapping the light shielding pattern 11 by which light is shielded, such that the light shielding area is not increased due to the display part spacers 14. Then, since the width of the light shielding pattern 11 is different from that of the display part spacers 14, the display part spacers 14 can partially overlap the light shielding pattern 11. In an actual LCD, the display part spacers 14 are formed on an end portion of the display part color filter 12 on the light shielding pattern 11.

If the display part spacers 14 are formed on the R color filter elements, it is preferable that the peripheral part color filter 13 be selected to be red, for embodiments in which different color filter elements are formed with different vertical heights. As noted above, the R color filter elements/G color filter elements/B color filter elements may be formed at different vertical heights if necessary/desired. If the height difference between the R color filter elements/G color filter elements/B color filter elements is relatively large, then if the display part spacers 14 are formed on the R color filter elements and the peripheral part spacer 15 is formed on the G color filter element (for example), their respective upper surfaces become different though the spacers are formed with the same thickness.

An upper end of the peripheral part spacer 15 contacts the second substrate at the peripheral part 2. If there is a relatively large height difference between display part spacer 14 and peripheral part spacer 15, the cell gap between the substrates cannot be maintained at a substantially constant value. Accordingly, it is preferable that the color of the peripheral color filter 13 be selected to be the same as the color of the display part color filter elements on which the display part spacers 14 are formed. In addition, in order to minimize the height of the spacers 14, 15, the spacers 14, 15 may be formed on the color filter elements having the lowest height.

Figure 5A:
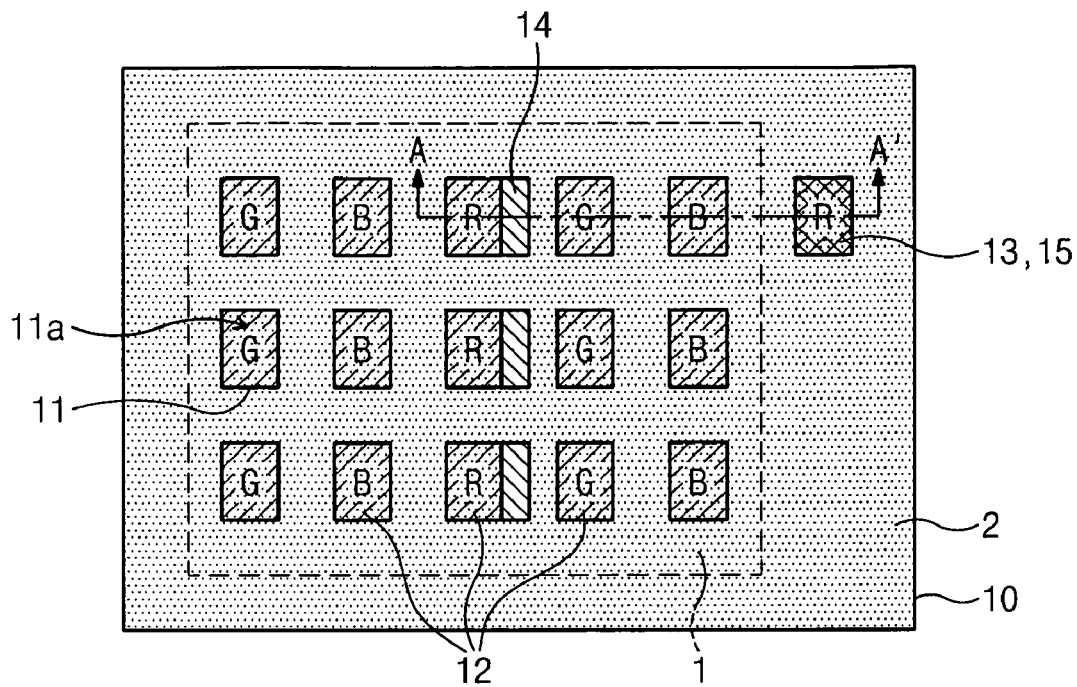
Figure 5B:
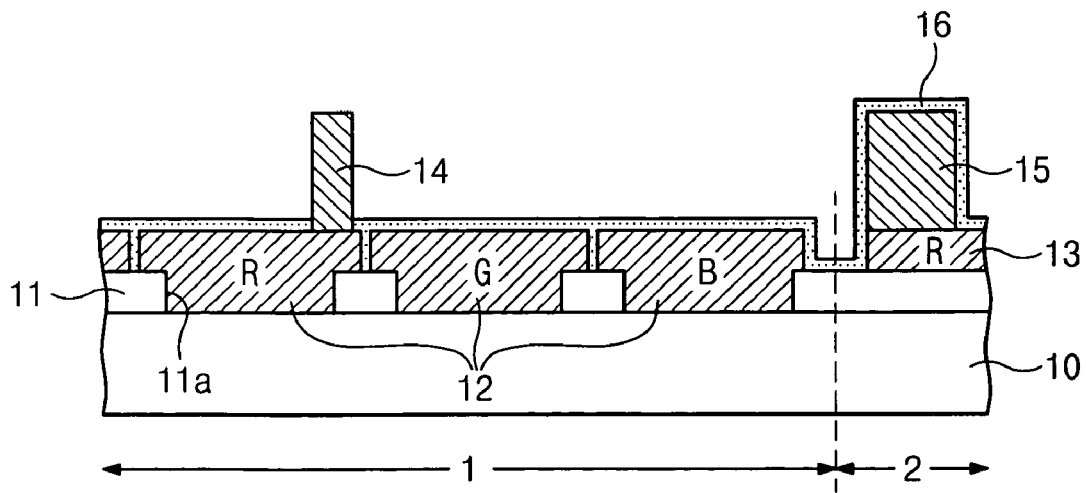

Next, referring to FIGS. 5A and 5B, a transparent conductive film 16 is deposited on the substrate 10. The transparent conductive film 16 is formed on the entire surface of the substrate 10 by a sputtering using indium zinc oxide (IZO) or indium tin oxide (ITO) to cover the outer surfaces of the display part spacers 14 and the peripheral part spacer 15.

Next, the transparent conductive film 16 is patterned such that it remains on the outer surface of the peripheral part spacer 15 and is removed from the outer surface of the display part spacers 14. Since the outer surface of the peripheral spacer 15 is covered with the transparent conductive film, the peripheral spacer 15 can be used to apply a common voltage to the substrate 10. In contrast, since the transparent conductive film deposited on the outer surface of the display part spacers 14 is completely removed, the display part spacers 14 are substantially non-conductive and accordingly function to maintain the cell gap.

Transparent conductive film pattern 16 on substrate 10 serves as a common electrode for applying a common voltage through the peripheral spacer 15. The common electrode may have a cutaway pattern (not shown) or a protrusion pattern (not shown) so as to widen the viewing angle, and the cutaway pattern can be formed while the transparent conductive film is patterned. Detailed description related to the cutaway pattern and its formation will be provided later.

In the above, a fabrication process including forming the display part spacers for maintaining the cell gap and at the same time forming the peripheral part spacer for applying a voltage to the common electrode on the first substrate, thereby omitting a separate short point process, has been described. While the above fabrication process has been described with respect to the first substrate having the common electrode, embodiments of the present invention can be applied to the second substrate facing the first substrate in addition to or instead of the first substrate.

FIGS. 6A through 8A are plane views illustrating a method of fabricating a second substrate according to an embodiment of the present invention, and FIGS. 6B through 8B are sectional views taken along the lines B-B' of FIGS. 6A through 8A. The above-referenced figures show a unit pixel of the display part and omit the peripheral part.

Figure 6A:
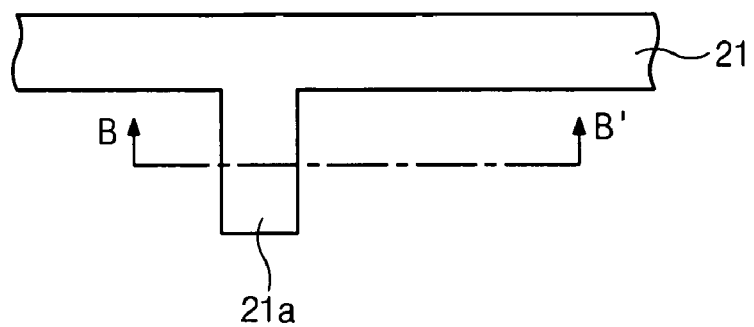
FIGS. 6A, 7A, and 8A are plane views illustrating a method of fabricating a second substrate according to an embodiment of the present invention.
Figure 6B:
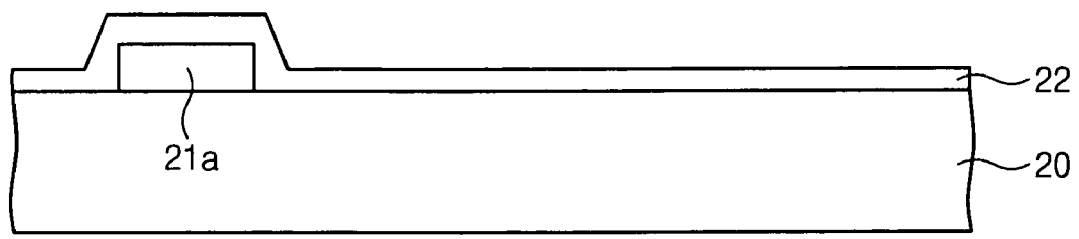
FIGS. 6B, 7B, and 8B are sectional views taken along the lines B-B' of FIGS. 6A through 8A.

Referring to FIGS. 6A and 6B, a gate line 21, a gate electrode 21a and a gate insulating layer 22 are formed on a second substrate 20. The gate line 21 and the gate electrode 21a are formed by depositing a metal film, comprising one or more conductive materials such as chromium (Cr), aluminum (Al) or Al alloy. Gate line 21 and gate electrode 21 may be formed by sputtering conductive material to deposit a metal film, and patterning the deposited metal film. The gate line 21 extends in one direction, for example, a row direction, and the gate electrode 21a is formed extending from a predetermined portion of the gate line 21. The gate insulating layer 22 insulates the gate line 21 and the gate electrode 21a, and may be formed using one or more insulating materials such as silicon nitride by a method such as plasma chemical vapor deposition.

Figure 7A:
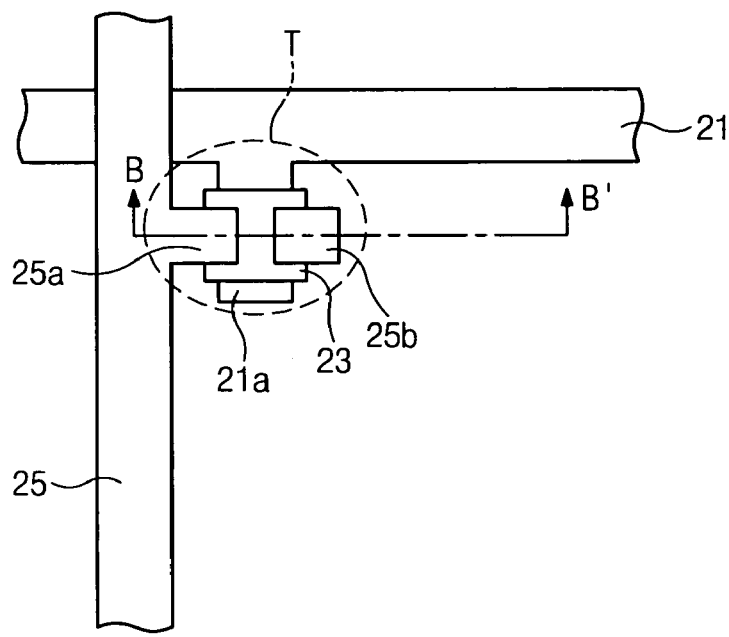
Figure 7B:
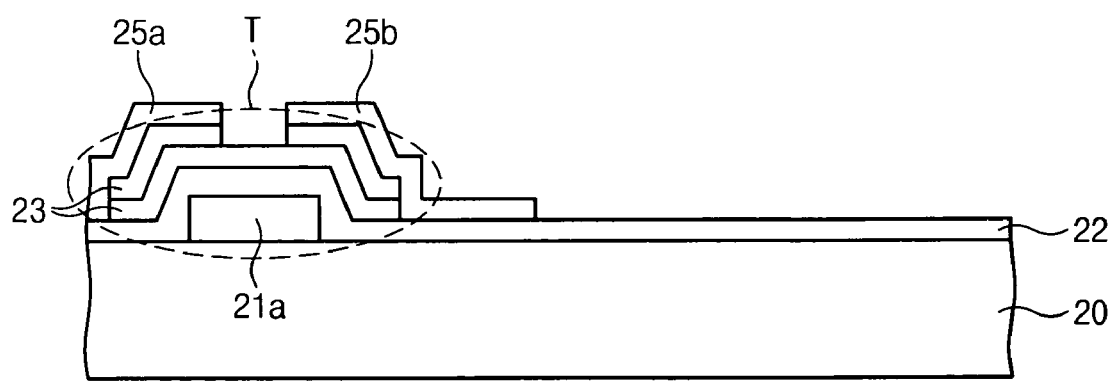

Referring to FIGS. 7A and 7B, a semiconductor pattern 23 is formed on the gate insulating layer 22. The semiconductor pattern 23 is formed at a position overlapping the gate electrode 21a by (for example) depositing an amorphous silicon layer and an n+ amorphous silicon layer and patterning the same.

Next, a data line 25, a source electrode 25a and a drain electrode 25b are formed on the second substrate 20 including the semiconductor pattern 23 by a similar method to the method used to form the gate line 21. The data line 25 is formed crossing the gate line 21. A unit pixel is defined by the gate line 21 and the data line 25 crossing each other. The source electrode 25a is formed extending from a predetermined portion of the data line 25. The drain electrode 25b is formed spaced apart by a predetermined distance from the source electrode 25a, and faces the source electrode 25a. An upper portion of the semiconductor pattern 23 made of n+ amorphous silicon layer is patterned using the source electrode 25a and the drain electrode 25b as an mask, so that a thin film transistor (T) serving as a switch element is completed. Thereafter, a passivation layer 24 protecting the thin film transistor (T) is formed.

In operation, a gate On signal or a data signal is applied to one end of the gate line 21 or the data line 25 through a pad (not shown) formed on the peripheral part 2. Also, a common voltage is applied to the common electrode through the pad and a common voltage connector (not shown) connected with the pad. The common voltage connector (which may be referred to as a common voltage applying part) can be formed together with the data line 25 and the like.

Figure 8A:
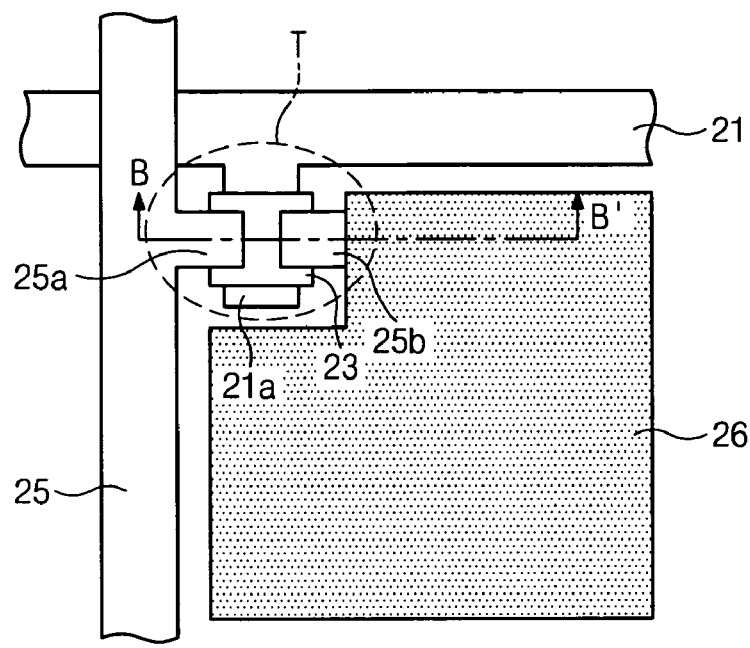
Figure 8B:
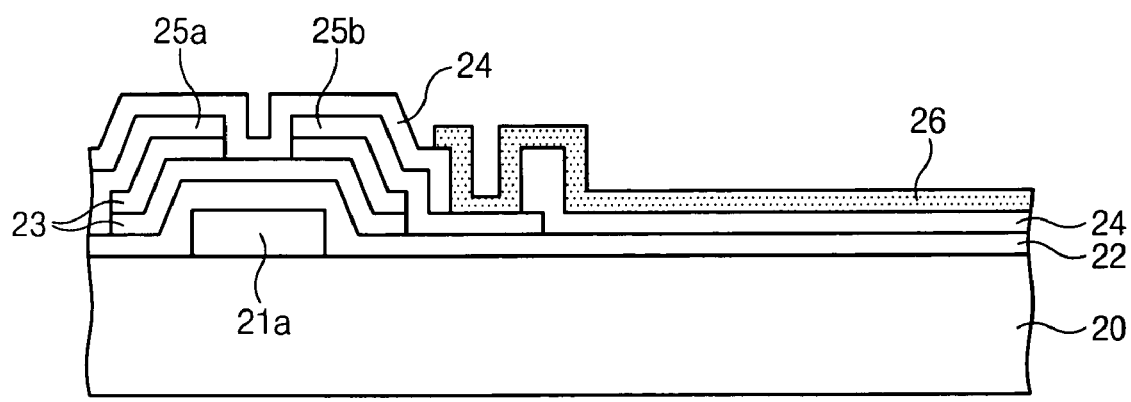

Referring to FIGS. 8A and 8B, a transparent conductive layer pattern 26 is formed on the passivation layer 24 so as to be separated from adjacent transparent conductive layer patterns (not shown). Hereinafter, for the convenience of description, the transparent conductive layer pattern formed on a first substrate 10 is referred to as a 'first transparent conductive layer pattern 16' and a transparent conductive layer pattern formed on the second substrate 20 is referred to as a 'second transparent conductive layer pattern 26'. In the same way the common electrode is formed by the first transparent conductive layer pattern 16, the pixel electrode is formed in each pixel by the second transparent conductive layer pattern 26. The pixel electrode is connected with the drain electrode 25b.

The second transparent conductive layer pattern 26 is formed by depositing a transparent conductive layer, such as ITO or the like and patterning the same. The second transparent conductive layer pattern 26 may be formed to have a cutaway pattern (not shown) by cutting away a predetermined portion thereof. The cutaway patterns of the transparent conductive layer patterns 16 and 26 are formed so as not to overlap each other, and they function to increase the viewing angle.

After the first and second substrates are prepared by the above method, they are aligned to face each other and are attached to each other.

Figure 9B:
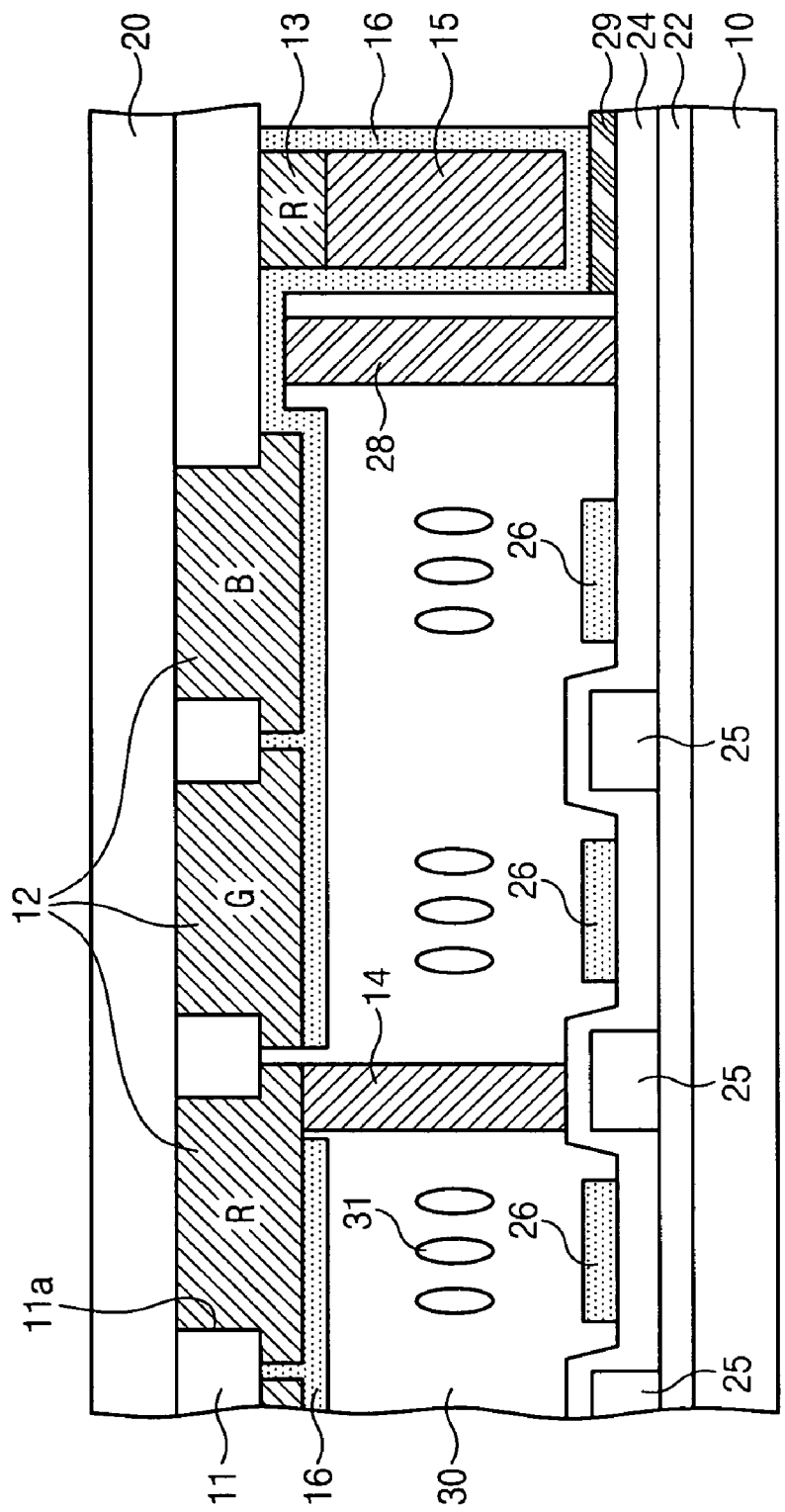
FIG. 9B is a sectional view taken along the line C-C' of FIG. 9A.

FIG. 9A is a plane view when a first substrate and a second substrate are attached according to an embodiment of the present invention, and FIG. 9B is a sectional view taken along the line C-C' of FIG. 9A.

Referring to FIGS. 9A and 9B, the first substrate 10 and the second substrate 20 are attached to face each other, and a liquid crystal layer 30 is interposed between the first substrate 10 and the second substrate 20. Prior to introducing liquid crystal between first substrate 10 and second substrate 20, an alignment film (not shown) is first coated on each of the first substrate 10 and the second substrate 20. An upper surface of the alignment film is then rubbed using a rubbing cloth so that molecules of liquid crystal 31 of a liquid crystal layer 30 are generally aligned in a desired direction. Since the alignment film is formed using insulator material, such as polyimide, it is not coated on the peripheral part spacer 15 serving as the short point, but is coated only on the display part 1.

Next, a seal line 28 is formed on the second substrate 20. The seal line 28 is formed of a thermosetting sealant along an edge of the second substrate 20. The thermosetting sealant is used to attach the first substrate 10 and the second substrate 20 to each other. Liquid crystal 31 is dropped inside the seal line 28 to form the liquid crystal layer 30. The seal line 28 may be formed bypassing and as near as possible/practical to a region where the peripheral part space 15 is formed. This is to stably attach the first substrate 10 and the second substrate 20 by allowing the adhesive force of the seal line 28 to be exerted to the peripheral part spacer 15, which does not have the adhesive force by itself. Likewise, the liquid crystal layer 30 is formed in a state that the inner pressure of the display part 1 is kept lower than the atmospheric pressure to stably attach the first substrate 10 and the second substrate 20.

The first substrate 10 and the second substrate 20 are first aligned, then attached to each other as the sealant is hardened by a thermal pressure. A common voltage applying part 29 (e.g., a connector) that may be used to apply a signal for a common voltage is formed on the second substrate 20 to contact one end of the peripheral part spacer 15. In operation, a common voltage is applied to the first transparent conductive layer pattern 16 forming the common electrode of the first substrate 10 through the peripheral part spacer 15.

According to embodiments of the present invention, by implementing a conductive peripheral part spacer as described above, a short point process may be omitted. For example, since the peripheral part spacer 15 is formed together with the display part spacer 14 and the first transparent conductive layer pattern 16 is formed on the surface of the peripheral part spacer 15 together with the common electrode, the short point process for applying a voltage to the common electrode can be omitted. As a result, the number of the steps needed to fabricate a display can decrease, and the material cost can be reduced.

In particular, it is possible to allow the first transparent conductive layer pattern 16 to have a cutaway pattern in the common electrode of the display part 1. The forming of the cutaway part can be performed simultaneously with the forming of the transparent conductive layer pattern 16 on the peripheral part spacer 15 to provide the peripheral part spacer 15 conductivity.

The cutaway patterns of the common electrode and the pixel electrode function to increase the viewing angle of the LCD. Hereinafter, the structure of the LCD manufactured by the above fabrication method will be described, as will the effects of the cutaway patterns. However, detailed description of replicated content with that described in the conventional fabrication method may be omitted.

Again referring to FIGS. 9A and 9B, the light shielding layer pattern 11 having the opening 11*a* is formed on the first substrate 10, and the gate line 21 and the data line 25 are formed crossing each other to define a unit pixel region overlapping the opening 11*a*. A thin film transistor (not shown) and the second transparent conductive layer pattern 26 is formed on each pixel region of the second substrate 20, and the common electrode made of the first conductive pattern 16 is formed on the first substrate 10. Spacers 14 and 15 are formed on the first substrate 10 so as to maintain the cell gap between the two substrates 10 and 20.

The spacers 14 and 15 are formed on an outer area of the region where the pixels are formed, as well as on the region where the pixels are formed. In other words, the display part spacers 14 are formed on the display part 1 where the pixels are formed, and the peripheral part spacer 15 is formed on the peripheral part 2 outside the display part 1. The peripheral part spacer 15 is used to apply a common voltage to the common electrode, as well as to maintain the cell gap between the two substrates 10 and 20. For this purpose, the second substrate 20 has the separate common voltage applying part 29 formed simultaneously with the data line 25 and the like, and is electrically connected with the peripheral part spacer 15. The LCD constructed as above operates as follows.

When a gate-On signal is applied to the gate line 21, the thin film transistor is turned on. As the thin film transistor is turned on, a data signal corresponding to image information is applied to the data line 25. At this time, a common voltage is applied to the common electrode through the peripheral part spacer 15 connected to the common voltage applying part 29, so that an electric field is generated in the liquid crystal layer 30 due to a voltage difference between the common electrode and the pixel electrode. The electric field changes the alignment direction of liquid crystal 31, so that the transmittance of liquid crystal 31 to light is changed. As a result, an image corresponding to the data signal is displayed on an upper surface of the LCD.

As noted above, the cutaway pattern can be formed in each of the pixel electrode and the common electrode such that the cutaway pattern does not overlap each of the pixel electrode and the common electrode. This embodiment will now be described with reference to the accompanying drawings.

Figure 10A:
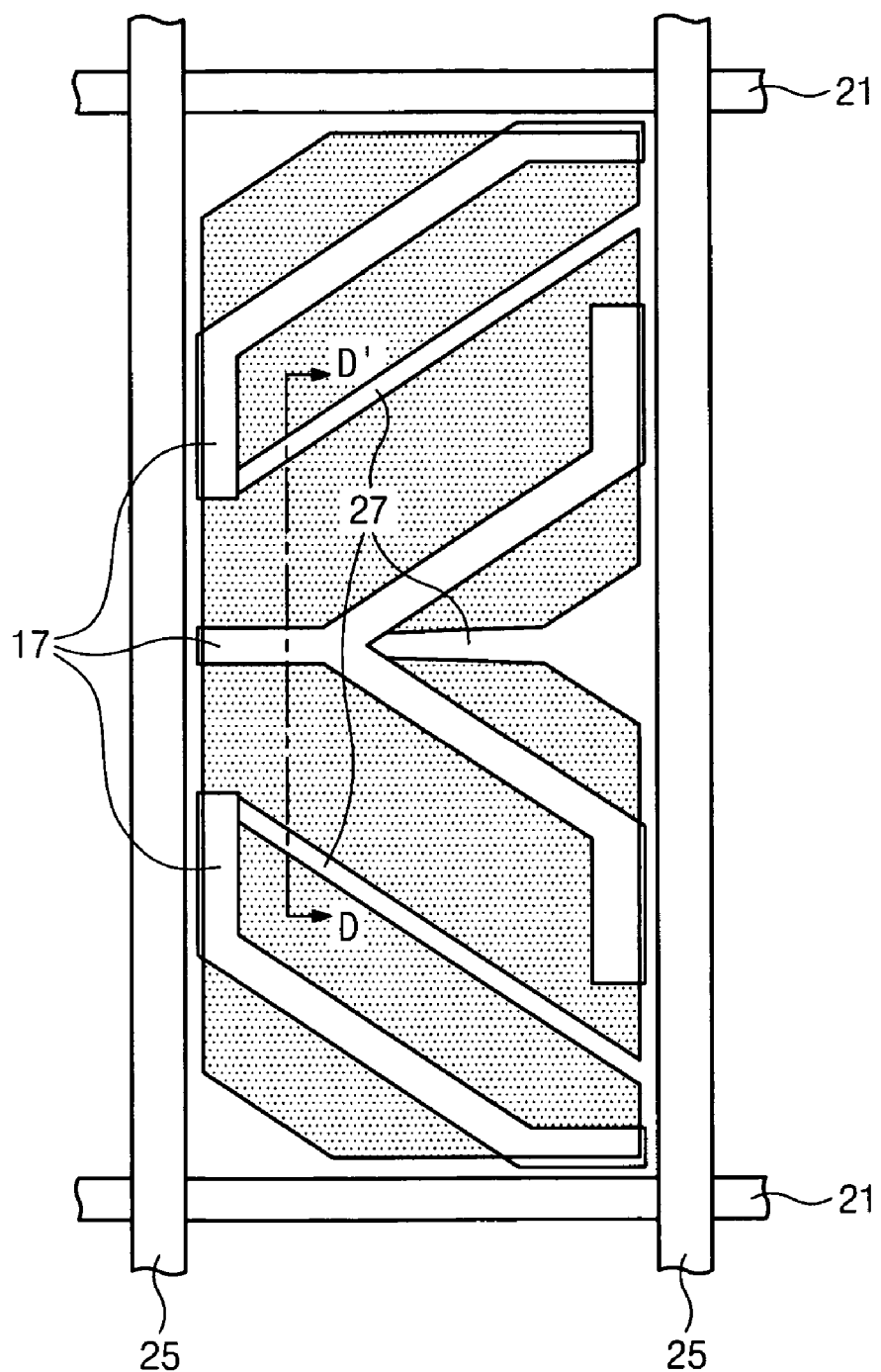

FIG 10A is a plane view of a unit pixel with a cutaway pattern according to an embodiment of the present invention and FIG. 10B is a sectional view taken along the line D-D' of FIG. 10A.

Referring to FIGS. 10A and 10B, the common electrode and the pixel electrode have a first cutaway pattern 17, and a second cutaway pattern 27 overlapping the first cutaway pattern 17. The first cutaway pattern 17 and the second cutaway pattern 27 increase the viewing angle of the LCD.

Since the liquid crystal 31 has refractive anisotropy, light transmittance is varied when molecules of the liquid crystal 31 are realigned. However, the refractive anisotropy causes the viewing angle of the LCD to be narrowed. In other words, when the liquid crystal 31 is aligned inclined with respect to a front surface of the LCD, light passes in a perpendicular direction to the front surface to display a true image, but does not pass in an inclined direction to the front surface. The displayed image may thus be distorted at some viewing angles, due to the refractive anisotropy.

To solve/reduce the viewing angle problem of the LCD, a unit pixel region is divided into two or more regions to form multi-domains, such that liquid crystal 31 is aligned in different directions in each of the multi-domains. For instance, when the liquid crystal 31 of a first region is aligned inclined in a first direction and the liquid crystal 31 of a second region is aligned inclined in a second direction, light may not pass in the first direction but may pass in the second direction, so that the viewing angle can be increased.

One method for forming the multi-domains is to form the cutaway patterns 17 and 27 by removing a predetermined portion of each of the pixel electrode and the common electrode. In other words, as shown in FIG. 10B, the direction of the electric field acting on the liquid crystal 31 is varied due to the cutaway patterns 17 and 27, so that the multi domains D1, D2, D3 and D4 where the liquid crystal molecules are aligned in different directions can be formed.

To form the multi domains, a protruded pattern (not shown), for example, a protrusion can be formed on the cut away portion of the first substrate 10. The protruded pattern also changes the direction of the electric field acting on the liquid crystal 31, and the multi domains can be formed having the protrusion as a boundary. Since the protruded pattern can be formed simultaneously with the display part spacers 14 and the peripheral part spacer 15, an additional process for forming the protruded pattern is not needed. However, to form the conductive peripheral part spacer 15 and the non-conductive display part spacers 14 together with the protruded pattern, a patterning process for forming the transparent conductive layer pattern 16 on the first substrate 10 is needed. It is possible to increase the response rate by forming the protrusion throughout a relatively wide area, which can be applied in embodiments of the present invention.

While embodiments of the present invention use the peripheral part spacer 15 as a short point with respect to the first substrate 10, the short point may be formed using the peripheral part color filter 13 as well as the peripheral part spacer 15. In other words, when the display part color filter 12 are formed in the order of R color filter element, G color filter element and B color filter element, the R color filter element, G color filter element and B color filter element may be stacked on the peripheral part 2, and the transparent conductive layer pattern 16 formed on a surface outside the peripheral part 2 to apply the common voltage.

However, as shown in FIG. 9B, since the peripheral spacer 15 contacts the upper surface of the second substrate 20, the peripheral spacer 15 should be formed at substantially the same height as the cell gap between the first substrate 10 and the second substrate 20. According to embodiments of the present invention, since the peripheral part spacer 15 is formed in the same process step as the display part spacers 14, the peripheral part spacer 15 can be easily formed at the same height as the height of the cell gap. In contrast, in embodiments where the color filter 12 and 13 are used as the short points, since the color filter elements are formed at the heights fixed according to the respective colors, it is relatively difficult to form the color filter layer at the same height as that of the cell gap. However, if the display part spacers 14 are formed at a different height than the peripheral part spacer 15, it is possible to adjust the height of the peripheral part spacer 15 by forming the peripheral part color filter 13 having two or more colors below the peripheral part spacer 15. Therefore, the cell gap between the first substrate 10 and the second substrate 20 may be maintained.

As described above, according to the LCD and fabrication method thereof, it is possible to form the spacer to maintain the interval between substrates and to form means for applying a common voltage to the common electrode using the same spacer. Accordingly, the separate short point process for applying the common voltage is omitted, thereby decreasing the number of the steps and reducing the material cost.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display comprising:
    a first substrate, a second substrate, and a liquid crystal layer interposed between the first substrate and the second substrate;
    a color filter formed on a predetermined region of the first substrate;
    a common electrode formed on and contacting the color filter;
    a plurality of gate lines and a plurality of data lines formed on the second substrate and crossing each other to define a plurality of pixels;
    a plurality of switch elements each being formed in each of the plurality of pixel regions, each of the plurality of switch elements connected to an associated one of the plurality of gate lines and an associated one of the plurality of data lines;
    a plurality of pixel electrodes each being connected with an associated one of the plurality of switch elements;
    a common voltage connector formed on the second substrate outside an area where the plurality of pixel regions are defined, the common voltage connector configured to apply a common voltage to the common electrode; and
    a plurality of spacers positioned and configured to substantially maintain a predetermined interval between the first substrate and the second substrate,
    wherein at least one of the plurality of spacers is disposed outside the area where the plurality of pixel regions are defined,
    wherein the common electrode covers the at least one spacer of the spacers disposed outside the area where the pixel regions are defined, and wherein the at least one spacer formed outside the area where the pixel regions are defined is electrically connected to the common voltage connector.

2. The liquid crystal display of claim 1, wherein each of the first and second substrates includes a display part in the area of the substrate where the pixel regions are formed and a peripheral part surrounding the area of the substrate where the pixel regions are formed,
    and wherein the plurality of spacers comprises a display part spacer disposed on the display part of the first substrate and wherein the at least one spacer includes a peripheral part spacer disposed on a peripheral part of the substrate and electrically connected to the common voltage connector; and
    wherein the color filter comprises a display part color filter formed below the display part spacer and a peripheral part color filter formed below the peripheral part spacer.

3. liquid crystal display of claim 2, further comprising a passivation layer formed on the display part color filter and the peripheral part color filter.

4. The liquid crystal display of claim 3, wherein the display part color filter comprises a plurality of color filter elements of different colors, wherein the color filter elements of different colors are regularly arranged, and wherein the peripheral part color filter comprises a plurality of color filter elements each having the same color.

5. The liquid crystal display of claim 3, wherein the display part color filter comprises a plurality of color filter elements of different colors, wherein the color filter elements of different colors are regularly arranged, and wherein the peripheral part color filter comprises a color filter element including at least a first portion of a first color stacked on a second portion of a second color different than the first color.

6. The liquid crystal display of claim 5, wherein the plurality of spacers comprises a plurality of display part spacers each formed on associated color filter elements having a first color.

7. liquid crystal display of claim 6, wherein the peripheral part color filter has the first color.

8. The liquid crystal display of claim 7, wherein the common electrode comprises a first cutaway pattern, and wherein the pixel electrode comprises a second cutaway pattern, and wherein the second cutaway pattern does not overlap the first cutaway pattern.

9. The liquid crystal display of claim 7, wherein the common electrode comprises a protruded pattern and the pixel electrode comprises a cutaway pattern, and wherein the cutaway pattern overlaps the protruded pattern.

10. The liquid crystal display of claim 9, wherein the second substrate further comprises a seal line formed adjacent to but bypassing a region where the peripheral spacer is formed.

* * * * *